July 8, 1952  L. J. E. A. DODIN  2,602,370
APPARATUS FOR PHOTOGRAPHIC REPRODUCTION OF DOCUMENTS
Filed Sept. 7, 1949
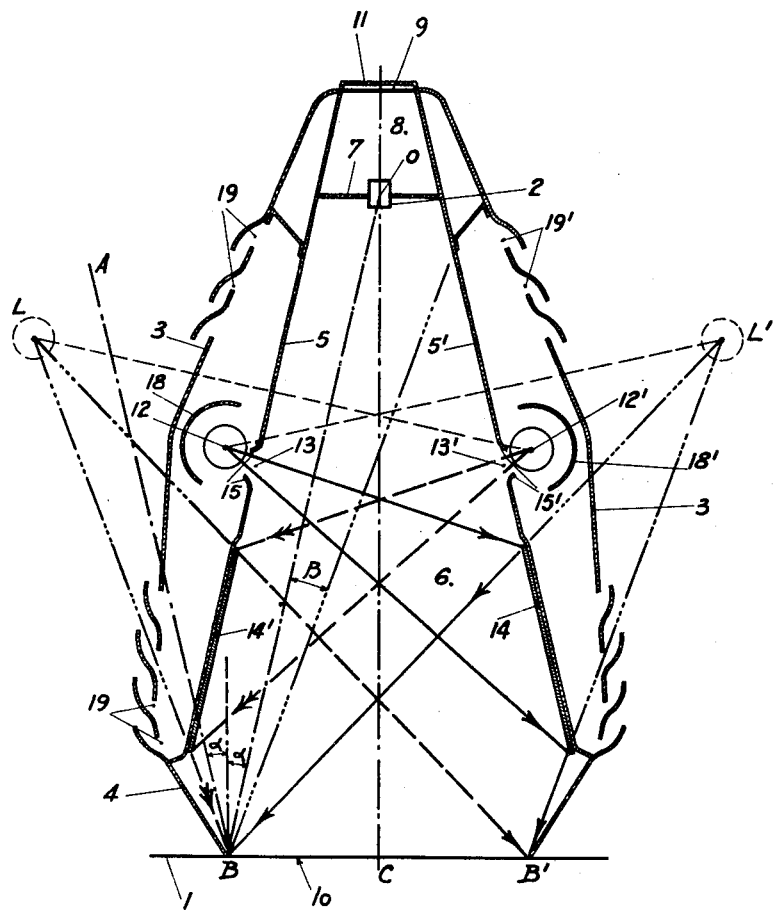
Lucien J.E.A. Dodin
INVENTOR
by Paul H. Smolka
HIS ATTORNEY Patented July 8, 1952

2,602,370

UNITED STATES PATENT OFFICE 2,602,370

APPARATUS FOR PHOTOGRAPHIC REPRODUCTION OF DOCUMENTS

Lucien Jules Emile André Dodin,
Canet Plage, France

Application September 7, 1949, Serial No. 114,437
In France September 20, 1948

1 Claim. (Cl. 88—24)

My invention relates to apparatus for photographic copying of documents and more particularly to the arrangement of the means therein for providing proper illumination.

The primary object of my invention is to provide a photographic copying apparatus which is compact and easy to operate. Another object of my invention is to avoid in photographic copying apparatus the illumination of the document to be reproduced by direct beams of light and to eliminate their reflection into the objective of the apparatus.

The said and other objects of my invention will be apparent from the following description when read with the accompanying drawing in which an embodiment is illustrated in an elevational sectional view.

The photographic copying apparatus according to my invention comprises a conventional projector tube 5 which has essentially the shape of a pyramidal frustrum and which may be provided at its open wider bottom and with a tapering extension 4 having a base opening 10 to receive the document to be reproduced. The plane 1 containing said base opening 10 is perpendicular to the longitudinal axis of the tube 5 which axis coincides with the optical axis of the objective 2 mounted in the partition 7 of said tube. Above said cross wall 7 is the photographic dark chamber 8 formed by the extended walls of the projector tube 5 and the top wall 11. The photographically sensitive paper, film, or the like 9 is placed within said chamber 8.

Whereas hitherto in photographic copying apparatus the illuminating means such as electric bulbs have been placed within the projector tube I place said illuminating means 15, 15' according to my invention outside said tube behind apertures 13, 13' arranged in the side wall of said tube intermediate between its base opening 10 and said partition 7. The inner surface of the projector tube 5 which is usually of rectangular cross section is at least on two opposite sides provided with mirrored surfaces 14, 14' extending between said apertures 13, 13' and said base opening 10. The said apertures 13, 13' are so arranged that beams of light emanating from the light sources 12, 12' fall upon the opposite mirrored surfaces 14 and 14', respectively, without directly illuminating the document placed in the base opening 10. Thus the document is exclusively illuminated by beams of light which are reflected thereupon by the said mirrored surfaces 14, 14'. The inner surface of the projector tube 5 above the apertures 13, 13' is opaque so that beams of light incident thereupon are prevented from being reflected into the objective 2.

The projector tube 5 and the illuminating means 15, 15' may be enclosed in an outer casing 3 which is provided with ventilating apertures 19, 19'. Reflectors 18, 18' may also be provided behind the illuminating means 12, 12' within said outer casing 3.

Although only one embodiment of my invention has been shown and described by way of illustration, it will be well understood that it may be constructed in various other embodiments which come within the scope of the appended claim.

What I claim as my invention is:

In a photographic copying apparatus the improvement comprising in combination a projector tube having essentially the shape of a pyramidal frustrum; the base opening therein adapted to receive the document to be photographically copied and the top end thereof adapted to receive a photographic lens tube; the optical axis of said lens tube coinciding with the longitudinal axis of the projector tube and passing perpendicularly through the center of the base opening of said projector tube; one aperture in each of at least two opposite inclined side walls of said projector tube arranged intermediate between the base opening and the top end thereof; a mirrored surface on each of said inclined side walls of the projector tube between said aperture and said base opening, a light source arranged behind each of said apertures outside the projector tube and directing its beams of light upon the mirrored surface opposite to said aperture; said mirrored surface arranged to reflect the incident beams of light upon the document mounted in the base opening of the projector tube; each of said apertures shaped to shield said document from direct rays emanating from the light source; and the inner surface of the projector tube outside said mirrored surface being opaque to prevent reflection of light beams into the lens tube.

LUCIEN JULES EMILE ANDRÉ DODIN.

REFERENCES CITED

The following references are of record in the file of this patent:

UNITED STATES PATENTS

| Number | Name | Date |
|---|---|---|
| 1,808,118 | Peterson | June 2, 1931 |
| 2,478,641 | Rose | Aug. 9, 1949 |
| 2,481,694 | Schubert | Sept. 13, 1949 |
| 2,530,843 | Smith | Nov. 21, 1950 |